United States Patent
Niitsuma et al.

(10) Patent No.: US 9,832,983 B2
(45) Date of Patent: Dec. 5, 2017

(54) DUAL-BEARING REEL

(71) Applicant: Shimano Inc., Sakai, Osaka (JP)

(72) Inventors: Akira Niitsuma, Osaka (JP); Yoshio Umezawa, Osaka (JP); Satoshi Fujii, Osaka (JP); Takeshi Fujiwara, Osaka (JP); Takanori Maruoka, Osaka (JP)

(73) Assignee: Shimano Inc., Osaka (JP)

( * ) Notice: Subject to any disclaimer, the term of this patent is extended or adjusted under 35 U.S.C. 154(b) by 351 days.

(21) Appl. No.: 14/722,493

(22) Filed: May 27, 2015

(65) Prior Publication Data
US 2016/0015015 A1 Jan. 21, 2016

(30) Foreign Application Priority Data

Jul. 16, 2014 (JP) .................................. 2014-146107
Jul. 16, 2014 (JP) .................................. 2014-146108
Jul. 16, 2014 (JP) .................................. 2014-146109

(51) Int. Cl.
| | | |
|---|---|---|
| A01K 89/01 | (2006.01) | |
| A01K 89/0155 | (2006.01) | |
| A01K 89/015 | (2006.01) | |
| A01K 89/033 | (2006.01) | |

(52) U.S. Cl.
CPC .... *A01K 89/01555* (2013.01); *A01K 89/0193* (2015.05); *A01K 89/01931* (2015.05); *A01K 89/045* (2015.05)

(58) Field of Classification Search
CPC ....................... A01K 89/0155; A01K 89/01555
See application file for complete search history.

(56) References Cited

U.S. PATENT DOCUMENTS

| 4,549,703 | A | * | 10/1985 | Atobe | .............. | A01K 89/01555 242/288 |
| 4,779,814 | A | * | 10/1988 | Uetsuki | ............ | A01K 89/01555 242/288 |
| 2009/0166459 | A1 | * | 7/2009 | Niitsuma | .......... | A01K 89/01555 242/287 |
| 2013/0075512 | A1 | * | 3/2013 | Takechi | ............. | A01K 89/0155 242/283 |
| 2013/0306777 | A1 | * | 11/2013 | Ikebukuro | ........ | A01K 89/01555 242/288 |
| 2014/0110517 | A1 | * | 4/2014 | Niitsuma | .......... | A01K 89/01555 242/288 |
| 2014/0374524 | A1 | * | 12/2014 | Takechi | ............. | A01K 89/0155 242/289 |

FOREIGN PATENT DOCUMENTS

JP 2007-135417 A 6/2007

* cited by examiner

*Primary Examiner* — Emmanuel M Marcelo
(74) *Attorney, Agent, or Firm* — Global IP Counselors, LLP

(57) ABSTRACT

A dual-bearing reel includes a reel body, a spool rotatably held between side plates, and a brake unit configured to brake the spool. The brake unit includes a cover portion, a first regulator and a second regulator. The cover portion has a first circumferential part and a second circumferential part, and is mounted to the reel body. The first regulator and the second regulator are covered with the cover portion. The first circumferential part has a first opening exposing at least a part of the first regulator therethrough, whereas the second circumferential part has a second opening exposing at least a part of the second regulator therethrough. The reel body has a first restriction part covering the first opening.

19 Claims, 11 Drawing Sheets

DUAL-BEARING REEL

CROSS-REFERENCE TO RELATED APPLICATIONS

This application claims priority to Japanese Patent Applications Nos. 2014-146107, 2014-146108 and 2014-146109 filed on Jul. 16, 2014, the entirety of each of which is hereby incorporated by reference.

BACKGROUND

Field of the Invention

The present invention relates to a dual-bearing reel equipped with a brake unit for braking a spool that is rotatable about a spool shaft with respect to a reel body of the dual-bearing reel.

Background Information

In general, conventional dual-bearing reels, especially, bait casting reels capable of releasing a fishing line in casting, are equipped with a brake unit for braking a spool. With this configuration, backlash can be prevented when casting.

A type of brake unit has been known that includes two regulators, i.e., a first regulator and a second regulator, in order to regulate a brake force as minutely as possible (see e.g., Japan Laid-open Patent Application Publication No. 2007-135417).

Conventional brake units are configured to brake the spool in an electrically controllable manner. These conventional brake units include a shaft support portion fixed to the reel body, a circuit board fixed to the inner surface of the shaft support portion, a brake portion including a magnet and a plurality of coils, a first regulator for regulating a brake force of the brake portion, and a second regulator. One end of a spool shaft is rotatably supported by the shaft support portion through a bearing. The magnet is mounted so as to be unitarily rotatable with the spool. The plurality of coils is mounted to the circuit board and is disposed on the outer peripheral side of the magnet in tubular arrangement. Each of the first and second regulators is rotatably mounted to the outer surface of the shaft support portion. Each of the first and second regulators has a disc shape and has a knob part protruding from the circular surface thereof along the diameter of the circular surface.

The first regulator sets a brake mode, whereas the second regulator regulates the magnitude of brake force in the set brake mode. The first regulator is covered with a cover portion that is openable and closable. Thus, the operation of the first regulator is disabled when the cover portion is closed. The second regulator is exposed through an opening bored in the cover portion. Thus, the operation of the second regulator is always freely enabled for regulating the magnitude of brake force. With this configuration, the brake mode is unlikely to be changed by an erroneous operation of the first regulator.

SUMMARY

In the conventional dual-bearing reel, the circular surface of each of the first and second regulators is designed to be operated. Hence, each of the first and second regulators has a large thickness in the direction of the rotary shaft of the spool. With this configuration, when the first regulator is covered, the dimension of the dual-bearing reel is accordingly increased in the direction of the rotary shaft of the spool.

It is an object of the present invention to reduce the dimension of a dual-bearing reel, in which at least either of first and second regulators is covered, in a direction of a rotary shaft of a spool.

A dual-bearing reel according to the present invention includes a reel body, a spool, a spool shaft and a brake unit. The reel body has a pair of side plates disposed at interval each other. The spool is rotatably held between the side plates. The spool shaft is a member to which the spool is coupled so as to be unitarily rotatable therewith. The brake unit is mounted to the reel body and is configured to brake rotation of the spool. Furthermore, the brake unit includes a first circumferential part, a second circumferential part that is different from the first circumferential part, a first regulator and a second regulator. The first regulator has a first exposed part that is at least partially exposed from the first circumferential part, and is configured to regulate a brake force within a first regulation range. The second regulator has a second exposed part that is at least partially exposed from the second circumferential part, and is configured to regulate the brake force within a second regulation range that is different from the first regulation range. The reel body has a restriction part that covers at least either of the first exposed part and the second exposed part.

In the present dual-bearing reel, the first regulator is at least partially exposed from the first circumferential part of the brake unit, whereas the second regulator is at least partially exposed from the second circumferential part of the brake unit. At least either of the first regulator and the second regulator is configured to be covered with the restriction part when the brake unit is mounted to the reel body. The first regulator is configured to be exposed from the first circumferential part, whereas the second regulator is configured to be exposed from the second circumferential part. Thus, each of the first and second regulators can be reduced in dimension in the direction of the rotary shaft of the spool. Furthermore, when the brake unit is mounted to the reel body, at least either of the exposed first and second regulators is covered with the restriction part. Thus, the dual-bearing reel, in which at least either of the first and second regulators is covered, can be reduced in dimension in the direction of the rotary shaft of the spool.

The brake unit may include a cover portion. The cover portion is attachable to the reel body and has a first opening and a second opening. The first opening is bored in the first circumferential part so as to expose the first exposed part therethrough. The second opening is bored in the second circumferential part so as to expose the second exposed part therethrough.

In this configuration, the first opening, bored in the first circumferential part of the cover portion, exposes at least a part of the first exposed part, whereas the second opening, bored in the second circumferential part, exposes at least a part of the second exposed part. The first exposed part is at least partially exposed through the first opening. However, when the cover portion is mounted to the reel body, the restriction part is configured to cover the first opening, and put differently, the first exposed part is configured to be covered with the restriction part. With this configuration, the brake unit can be exposed at its requisite part, and the area of the exposed part can be reduced to the minimum. Thus, integration of the brake unit is enabled, and the dual-bearing reel, which includes the first and second regulators and in which the first regulator is covered with the cover portion, can be reduced in dimension as much as possible in the direction of the rotary shaft of the spool.

The brake unit may be capable of electrically braking the spool. In this configuration, the spool can be electrically braked, and thus, variation in brake force with time can be flexibly set without being restricted by the rotational speed of the spool.

The first regulator may include a first operating portion and a first detector. The first operating portion has at least one first magnet and is at least partially exposed from the first circumferential part. The first detector is faced to the first magnet and is configured to detect a regulation position of the first operating portion. In this configuration, the regulation position of the first operating portion can be detected by detecting the magnetic flux of the first magnet. Thus, restrictions on the positional arrangement of the first detector can be eased.

The second regulator may include a second operating portion and a second detector. The second operating portion has at least one second magnet and is at least partially exposed from the second circumferential part. The second detector is faced to the second magnet and is configured to detect a regulation position of the second operating portion. In this configuration, the regulation position of the second operating portion can be detected by detecting the magnetic flux of the second magnet. Thus, restrictions on the positional arrangement of the second detector can be eased.

The brake unit may further include a brake portion and a first shield member. The brake portion may have a conductor and a brake magnet. The conductor is mounted to one of the reel body and the spool. The brake magnet is mounted to the other of the reel body and the spool so as to be at least partially faced to the conductor through a predetermined gap. The first shield member may be disposed between the first detector and the brake magnet.

In the present brake unit, the regulation position of the first operating portion is detected when the first detector of the first regulator detects the first magnet included in the first operating portion. The first shield member is disposed between the first detector and the brake magnet in order to shield the magnetic flux of the brake magnet. With this configuration, the first detector is unlikely to be affected by the brake magnet even when the regulation position of the first operating portion is detected on the basis of the detection of the first magnet. Thus, the position of the first operating portion can be accurately detected. Additionally, the reel body is not required to have a structure (e.g., a hole) for detecting the first operating portion. Moreover, the first operating portion can be disposed in an arbitrary position as long as the first magnet can be detected by the first detector that is shielded from the magnetic flux of the brake magnet by the first shield member. Therefore, restrictions on the positional arrangement of the first operating portion can be eased, and the regulation position of the first operating portion can be detected with a non-contact and simple construction.

The brake unit may further include a circuit board. The circuit board is mounted to the reel body and has a first surface faced to the spool. The brake magnet may be a cylindrical magnet mounted to the spool. The conductor may be formed by a plurality of coils. The coils are mounted to the first surface of the circuit board so as to be disposed on an outer peripheral side of the cylindrical magnet at predetermined intervals. In this configuration, the brake unit capable of electrically braking the spool can be produced. Furthermore, restrictions on the positional arrangement of the first operating portion can be eased, and the regulation position of the first operating portion can be detected with a non-contact and simple construction.

The first shield member may be mounted to at least a part of the first surface of the circuit board. In this configuration, the magnetic flux directed toward the first detector can be efficiently shielded by disposing the first detector on the second surface located on the opposite side of the first surface of the circuit board.

The brake unit may further include a rotation detector for detecting the rotation of the spool by variation in magnetic flux of the brake magnet. In this configuration, the rotation of the spool can be detected with the brake magnet. Thus, the spool is not required to have a component for rotation detection, and can be simply constructed.

The first shield member may have a cutout formed so as to enclose the rotation detector. In this configuration, the magnetic flux of the brake magnet reaches the rotation detector through the cutout without being shielded. Thus, the rotational speed of the spool and so forth can be accurately detected.

The first shield member may be further disposed between the second detector and the brake magnet. In this configuration, the second detector is unlikely to be affected by the magnetic flux of the brake magnet.

The brake unit may further include a stepped tubular cover member made of synthetic resin. The stepped tubular cover member has a first cover part and a second cover part. The first cover part covers the plurality of coils. The second cover part covers at least the first surface of the circuit board and is integrally formed with the first cover part. In this configuration, the circuit board and electric components mounted thereto such as the first detector, the second detector and the rotation detector can be protected by the cover member.

The first shield member may include a first shield portion and a second shield portion. The first shield portion is disposed on a stepped surface, faced to the spool, of the second cover part. The second shield portion is disposed on the first surface of the circuit board so as to shield a region located on an inner peripheral side of the first shield portion. In this configuration, the first shield member can be divided and disposed on the cover member and the circuit board. Thus, the magnetic flux of the brake magnet can be efficiently shielded by the first shield member.

The brake unit may further include a second shield member. The second shield member is mounted to at least a part of a second surface, located on an opposite side of the first surface, of the circuit board so as to be disposed at least either between the first magnet and the second detector or between the second magnet and the first detector. In this configuration, at least either of the first and second detectors is unlikely to be affected by the magnet for positional detection. Thus, at least either of the first and second detectors can be further enhanced in accuracy of detection.

The brake magnet may be polar-anisotropic magnet. In this configuration, the brake magnet is not radial-anisotropic magnet such that N-poles and S-poles are radially aligned, but is polar-anisotropic magnet such that N-poles and S-poles are circumferentially aligned. Thus, a surface magnetic flux density distribution having a sinusoidal wave like pattern is obtained and magnetic flux density less varies. Accordingly, the spool can be enhanced in rotational balance.

The brake magnet may be mounted to the spool shaft by bonding so as to be unitarily rotatable therewith. In this configuration, a strong force does not act on the brake magnet. Thus, the relatively fragile brake magnet can be easily mounted to the spool shaft without being damaged or broken.

The brake portion may further include an elastic ring and a compression member. The elastic ring is contactable to an end surface of the brake magnet. The compression member is fixed to the spool shaft and is capable of compressing the elastic ring together with the end surface by interposing and holding the elastic ring therebetween. In this configuration, the magnet is urged by the elastic ring. Hence, without applying an excessive stress to the magnet, the magnet can be mounted to the spool shaft so as to be unitarily rotatable therewith. The magnet may be herein bonded to the spool shaft. Alternatively, without being bonded to the spool shaft, the magnet may be mounted to the spool shaft so as to be unitarily rotatable therewith by a friction force to be generated by the urging force.

The bake magnet may have a recess on the end surface. The brake portion may further include a protrusion that is fixed to the spool shaft and is engaged with the recess. In this configuration, with the engagement of the protrusion with the recess, the brake magnet can be retained without applying a stress thereto, and simultaneously, can be mounted to the spool shaft so as to be unitarily rotatable therewith. Moreover, when bonding is additionally used, wobbling of the brake magnet in the rotational direction can be also reduced.

The recess may be recessed on the end surface along a radial direction of the end surface. Furthermore, the protrusion may have a pin member. The pin member is fixed to the spool shaft so as to radially penetrate therethrough. In this configuration, the magnet can be mounted to the spool shaft so as to be unitarily rotatable therewith by simply fixing the pin member with an arbitrary fixation method such as press-fitting or bonding.

Overall, according to the present invention, the first regulator is configured to be exposed from the first circumferential part, whereas the second regulator is configured to be exposed from the second circumferential part. Thus, when each of the first and second regulators is operated, the outer peripheral part thereof is touched by the finger of a user. Thus, each of the first and second regulators can be reduced in dimension in the spool shaft direction.

BRIEF DESCRIPTION OF THE DRAWINGS

Referring now to the attached drawings which form a part of this original disclosure.

DETAILED DESCRIPTION OF EMBODIMENTS

First Preferred Embodiment

Figure 1:
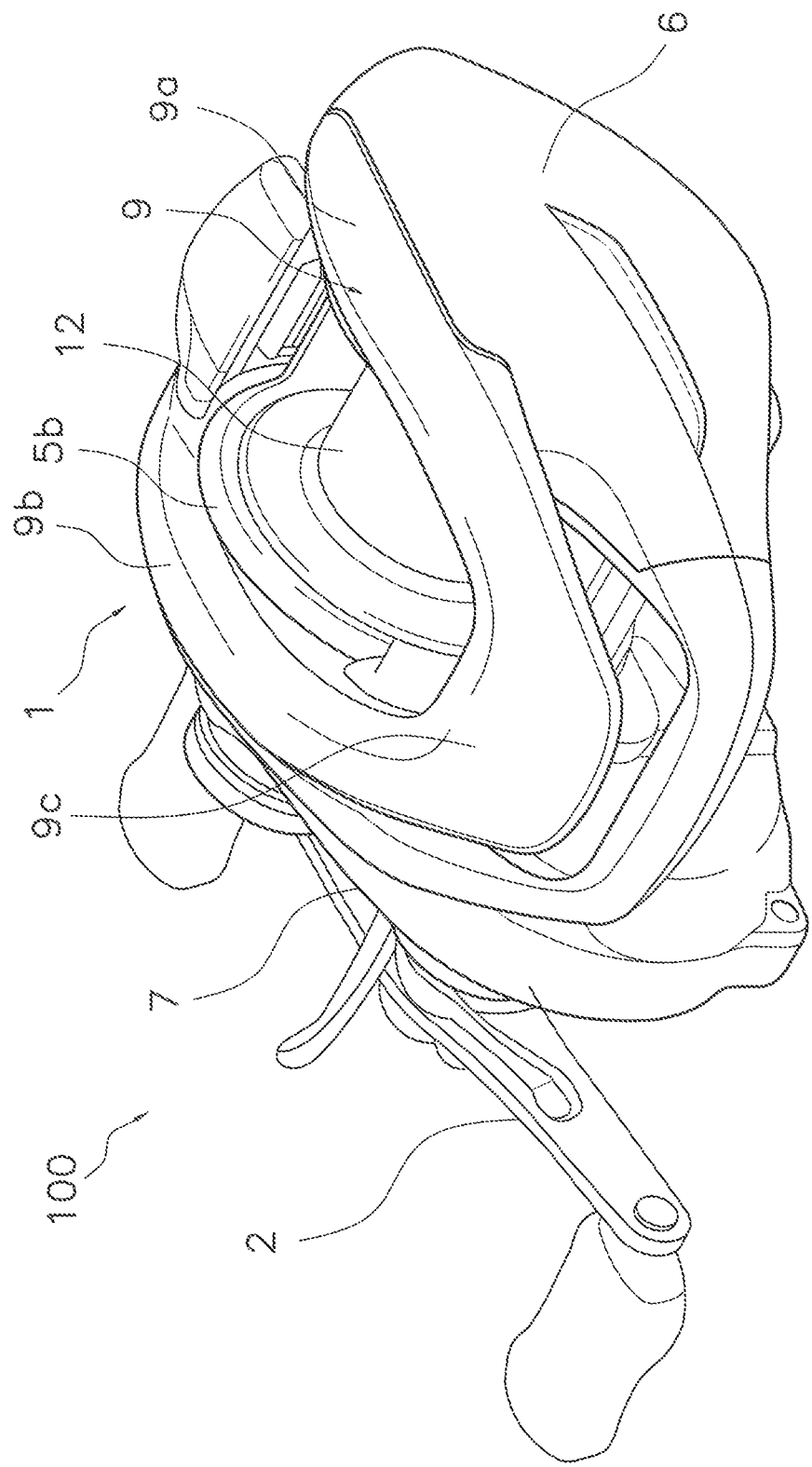
FIG. 1 is a perspective view of a dual-bearing reel according to a first preferred embodiment of the present invention.
Figure 2:
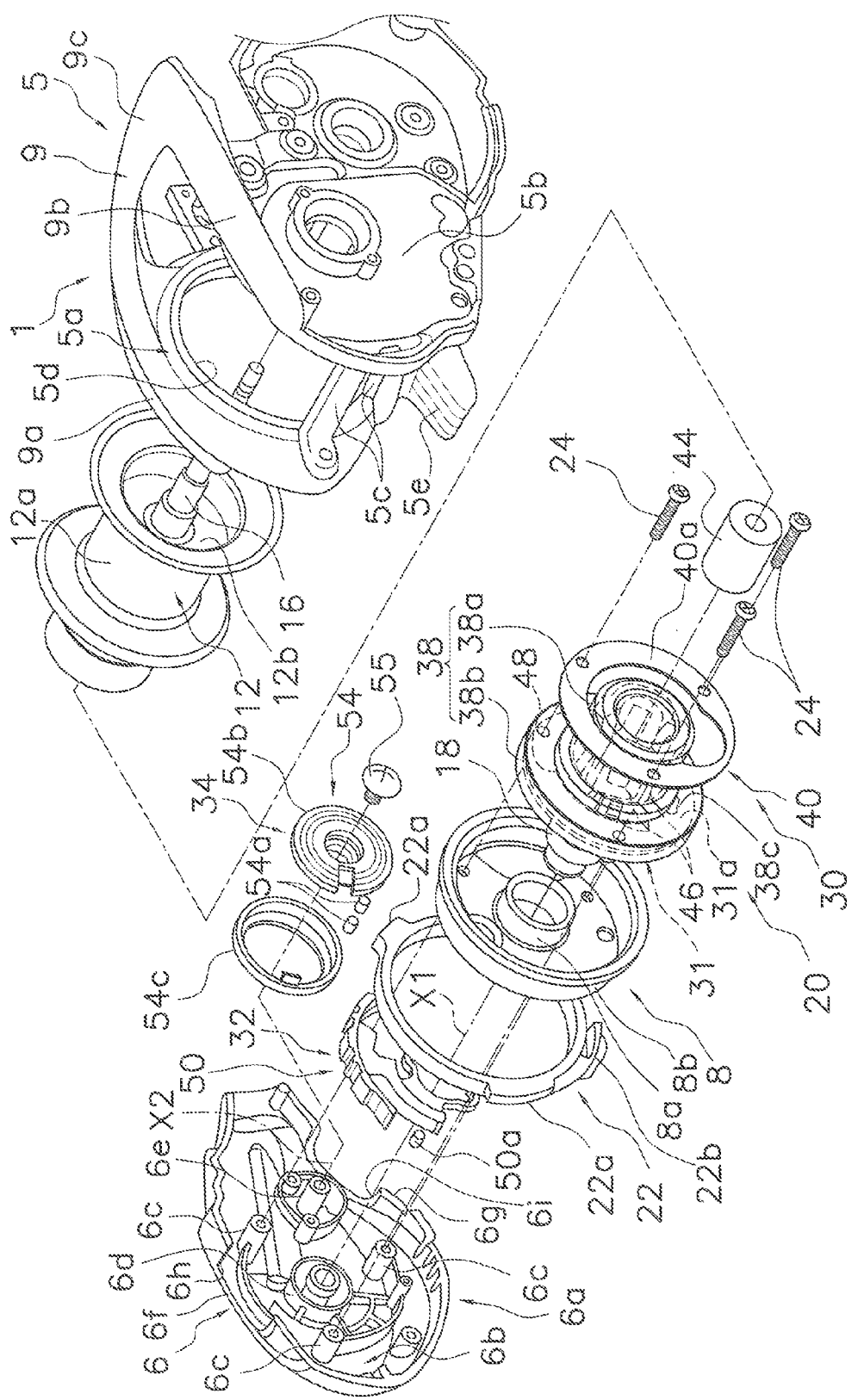
FIG. 2 is an exploded perspective view of the dual-bearing reel including a brake unit.

In FIGS. 1 and 2, a dual-bearing reel 100 according to a first preferred embodiment of the present invention is of a type capable of casting out a fishing line (i.e., reeling out a fishing line in a forward direction). The dual-bearing reel 100 includes a reel body 1, a handle 2, a spool 12, a spool shaft 16 and a brake unit 20 (see FIG. 2). The brake unit 20 is mounted to the reel body 1 and is configured to electrically brake rotation of the spool 12.

<Reel Body>

The reel body 1 includes an integrally formed frame 5 and a side cover 7 disposed on the handle 2 side of the frame 5.

As shown in FIG. 2, the frame 5 includes a first side plate 5a, a second side plate 5b, a plurality of coupling portions 5c and a thumb rest 9. The first side plate 5a is disposed on the opposite side of the handle 2. The second side plate 5b is disposed in opposition to the first side plate 5a. The coupling portions 5c couple the first side plate 5a and the second side plate 5b. The pair of the first and second side plates 5a and 5b is an example of a pair of the side plates. The spool 12 is rotatably held between the first side plate 5a and the second side plate 5b. The first side plate 5a has a circular opening 5d enabling the spool 12 to pass therethrough. A rod attachment leg 5e is mounted to one of the plurality of coupling portions 5c, i.e., the coupling portion 5c that couples the first side plate 5a and the second side plate 5b at their bottom side parts. The rod attachment leg 5e is configured to be attached to a fishing rod. The brake unit 20 is detachably mounted to the first side plate 5a of the frame 5 and is disposed about the opening 5d.

As shown in FIGS. 1 and 2, the thumb rest 9 has a first bulge part 9a, a second bulge part 9b and a third bulge part 9c. The first bulge part 9a outwardly bulges on the top of the first side plate 5a. The second bulge part 9b outwardly bulges on the top of the second side plate 5b. The third bulge part 9c forwardly bulges and couples the first side plate 5a and the second side plate 5b at the front of the frame 5.

The handle 2 is rotatably supported by the reel body 1. The spool 12 is disposed between the first side plate 5a and the second side plate 5b and is rotatably held by the reel body 1.

Figure 4:
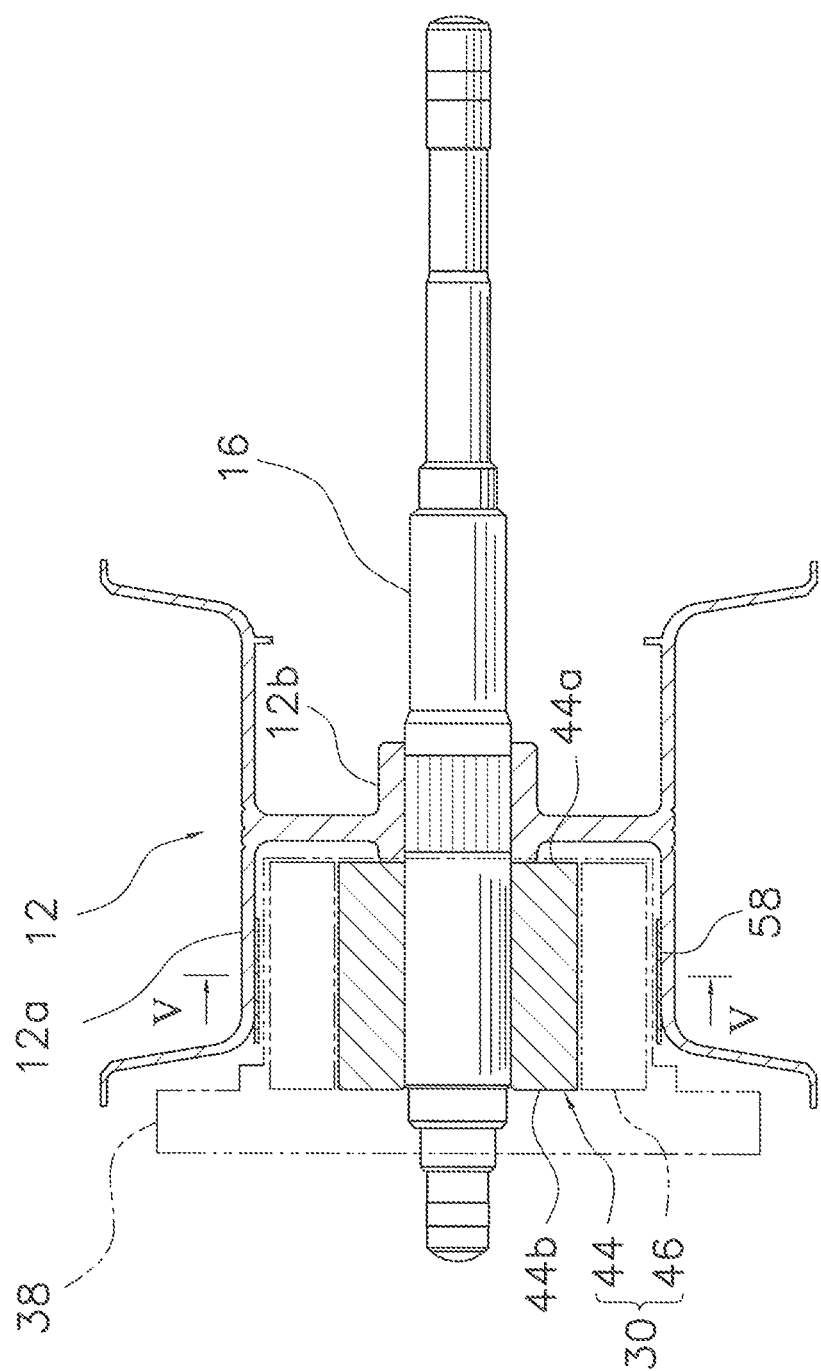
FIG. 4 is a cross-sectional view of a spool and a magnet.

As shown in FIG. 4, the spool 12 has a bobbin trunk 12a and a tubular part 12b. The bobbin trunk 12a enables the fishing line to be wound thereabout. The tubular part 12b is integrated with the bobbin trunk 12a and is fixed to the spool shaft 16. The spool shaft 16 is coupled to the inner peripheral surface of the tubular part 12b so as to be unitarily rotatable therewith. On end of the spool shaft 16 is rotatably supported by a shaft support portion 8 through a bearing 18. The other end of the spool shaft 16 is rotatably supported by the side cover 7 through a bearing (not shown in the drawings).

<Brake Unit>

Figure 3:
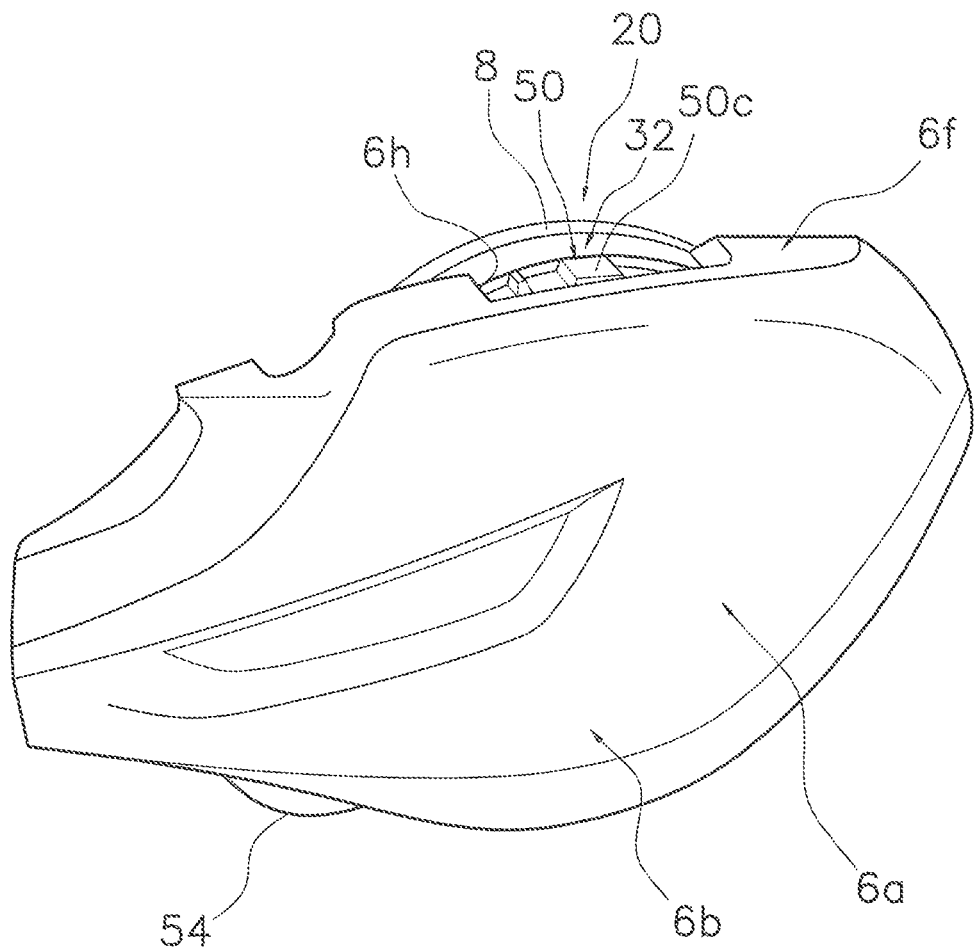
FIG. 3 is a perspective view of the brake unit.
Figure 6:
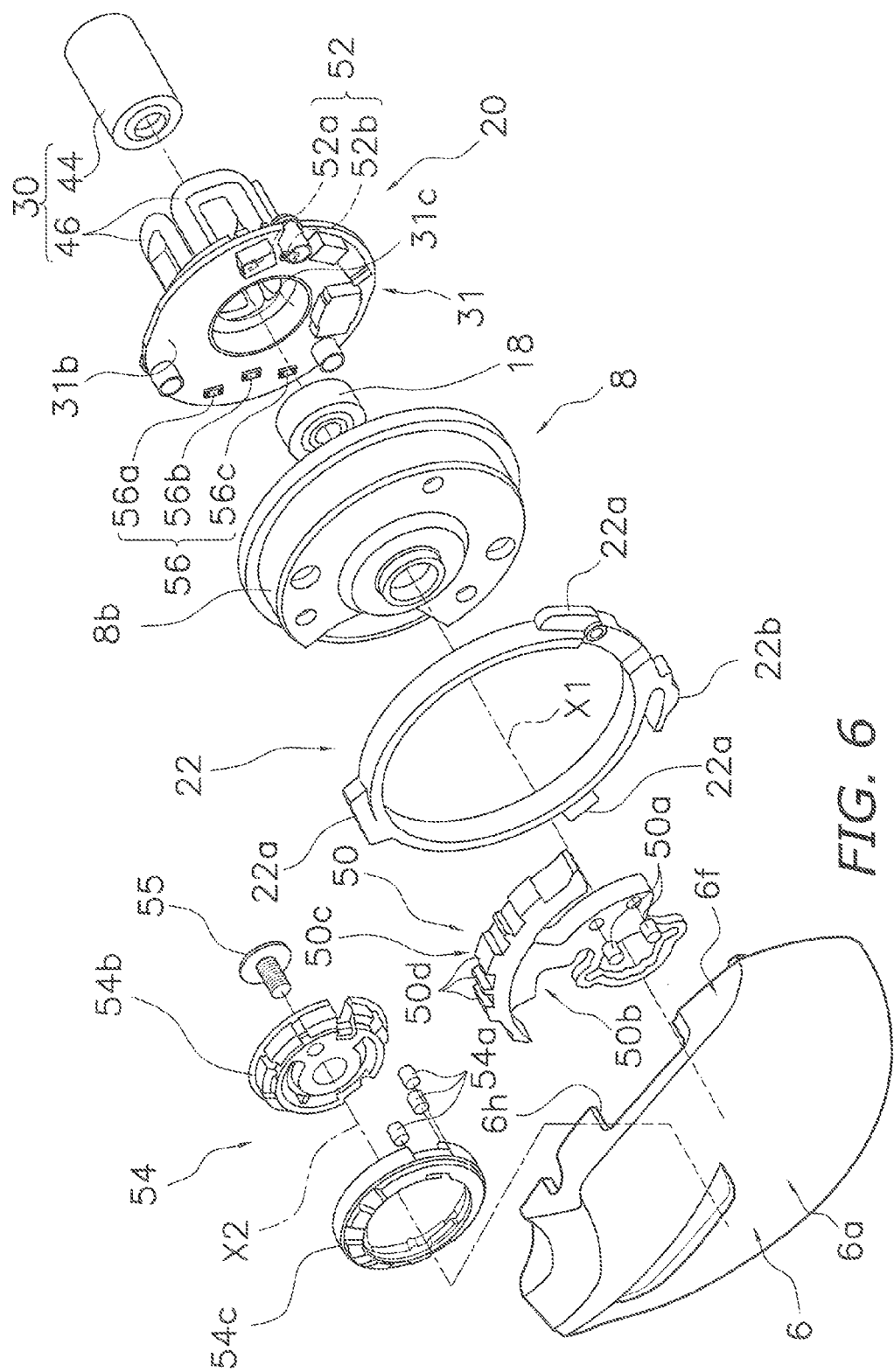
FIG. 6 is an exploded perspective view of the brake unit.

As shown in FIGS. 2, 3 and 6, the brake unit 20 includes a cover portion 6 having the shaft support portion 8, a brake portion 30, a circuit board 31, a first regulator 32, a second regulator 34, a rotation detector 36 (see FIG. 7), a cover member 38 and a first shield member 40. The brake portion 30 is configured to electrically brake the spool 12. The first regulator 32 is configured to regulate a brake force of the brake portion 30 within a first regulation range. The second regulator 34 is configured to regulate the brake force of the brake portion 30 within a second regulation range. The rotation detector 36 is configured to detect the rotation of the spool 12.

<Cover Portion>

As shown in FIG. 2, the cover portion 6 is detachably mounted to the first side plate 5a of the frame 5. The cover portion 6 has a cover body 6a and the shaft support portion 8 mounted to an inner surface 6b of the cover body 6a.

<Cover Body>

The cover body 6a has a plurality of (e.g., three) fixation bosses 6c on the inner surface 6b in order to fix the shaft support portion 8. Additionally, the cover body 6a has a first mount boss 6d and a second mount boss 6e on the inner surface 6b in order to enable a first operating portion 50 and a second operating portion 54 (both are to be described) of the brake unit 20 to be rotatably mounted thereto on a one-to-one basis. The first mount boss 6d is formed in a tubular shape about a first axis X1. The first axis X1 is arranged concentrically to the spool shaft 16 to be described when the cover body 6a is mounted to the first side plate 5a. The second mount boss 6e is formed about a second axis X2 arranged in parallel to the first axis X1. The second axis X2 is arranged forward of the first axis X1, and is also arranged closer to the rod attachment leg 5e than the first axis X1.

The cover body 6a has a first circumferential part 6f and a second circumferential part 6g. The first circumferential part 6f is located on the top side of the cover body 6a that is covered with the thumb rest 9. The second circumferential part 6g is different from the first circumferential part 6f. The first circumferential part 6f of the cover body 6a is disposed so as to be contactable to the thumb rest 9, and is covered with the first bulge part 9a of the thumb rest 9. The first bulge part 9a is an exemplary restriction part. The second circumferential part 6g is located on the opposite side of the first circumferential part 6f (i.e., the bottom side of the cover body 6a near the rod attachment leg 5e). The first circumferential part 6f has a first opening 6h having a roughly rectangular shape. The first opening 6h is bored for exposing the first operating portion 50 of the first regulator 32 to the outside. The second circumferential part 6g has a second opening 6i having a roughly rectangular shape. The second opening 6i is bored so as to expose the second operating portion 54 of the second regulator 34 to the outside. The first circumferential part 6f is covered with the first bulge part 9a, as shown in FIG. 1, in the condition that the brake unit 20 is mounted to the reel body 1. The second circumferential part 6g is not covered with the reel body 1. By contrast, when the brake unit 20 is detached from the reel body 1 as shown in FIG. 3, the first circumferential part 6f exposes at least a part of the first operating portion 50 of the first regulator 32 through the first opening 6h. The first operating portion 50 is disposed so as to slightly protrude from the first opening 6h.

<Shaft Support Portion>

As shown in FIG. 2, the shaft support portion 8 supports one end of the spool shaft 16 of the spool 12 in a rotatable state. The spool shaft 16 is an exemplary rotary shaft of the spool 12. The shaft support portion 8 is a shallow closed-end cylindrical member. The shaft portion 8 has a bearing accommodation part 8a in the center thereof. The bearing accommodation part 8a has a tubular shape and protrudes from the inner surface of the shaft support portion 8. The bearing accommodation part 8a accommodates the bearing 18 that supports one end of the spool shaft 16 in a rotatable state. An attachment/detachment ring 22 is rotatably mounted to an outer peripheral surface 8b of the shaft support portion 8. The attachment/detachment ring 22 serves to attach/detach the shaft support portion 8 to/from a region enclosing the opening 5d on the first side plate 5a. The attachment/detachment ring 22 enables the shaft support portion 8 to be attached to or detached from the first side plate 5a by a heretofore known bayonet structure. The attachment/detachment ring 22 has a plurality of (e.g., three) pawls 22a protruding radially outward and an operating knob 22b for attachment/detachment operation on the outer peripheral surface thereof. The plural pawls 22a respectively have slopes with gradually decreasing thicknesses and are designed to be engaged with a plurality of engaging grooves (not shown in the drawings) formed about the opening 5d. When the attachment/detachment ring 22 is rotated in one direction (e.g., the counterclockwise direction in FIG. 2) by downwardly operating the operating knob 22b with a user's finger, the pawls 22a disengage from the engaging grooves, and the shaft support portion 8 and the cover portion 6 detach from the first side plate 5a. By contrast, when the attachment/detachment ring 22 is rotated in the other direction by upwardly operating the operating knob 22b with the user's finger, for instance, the pawls 22a engage with the engaging grooves, and the shaft support portion 8 and the cover portion 6 fixes to the first side plate 5a. The shaft support portion 8 is fixed to the cover portion 6 together with part of constituent elements of the brake unit 20 by a plurality of (e.g., three) bolt members 24. In the condition that the shaft support portion 8 is fixed to the cover portion 6, the attachment/detachment ring 22 is restricted from moving in the spool shaft direction, and is rotatable with respect to the shaft support portion 8.

<Brake Portion>

Figure 5:
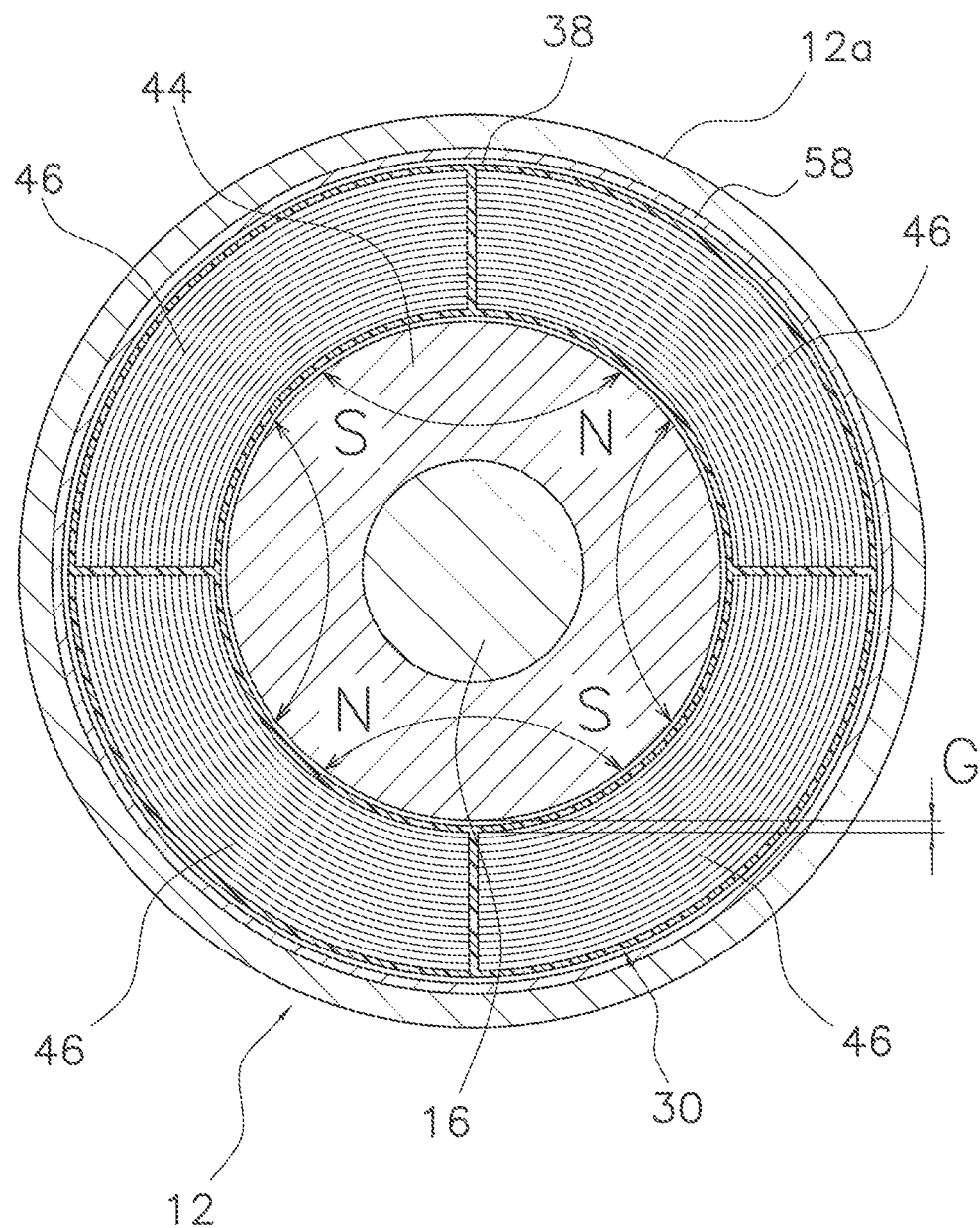
FIG. 5 is a cross-sectional view of FIG. 4 taken along cutaway line V-V and shows a magnetized state of the magnet.

As shown in FIGS. 4, 5 and 6, the brake portion 30 is capable of electrically braking the spool 12. The brake portion 30 includes a brake magnet 44 and a plurality of coils 46. The brake magnet 44 is mounted to the spool 12 through the spool shaft 16 so as to be unitarily rotatable therewith. The coils 46 are disposed in tubular arrangement on the outer peripheral side of the brake magnet 44 through a predetermined gap G (see FIG. 5), and are series-connected to each other. The coils 46 are exemplary conductors.

As shown in FIG. 5, the brake magnet 44 is disposed so as to be at least partially faced to the coils 46 through the predetermined gap G. In the present preferred embodiment, the brake magnet 44 is disposed so as to be entirely faced to the plural coils 46 disposed in tubular arrangement. The brake magnet 44 is mounted to the spool shaft 16 so as to be unitarily rotatable therewith. In the present preferred embodiment, the brake magnet 44 is fixed to the spool shaft 16 by bonding. As shown in FIG. 4, the brake magnet 44 is a cylindrical magnet having a first end surface 44a and a second end surface 44b located on the opposite side of the first end surface 44a. The brake magnet 44 is fitted to the spool shaft 16 by clearance fitting. The first end surface 44a of the brake magnet 44 is positioned at the end surface of the tubular part 12b of the spool 12 in the direction of the spool shaft 16. As shown in FIG. 5, the brake magnet 44 is polar anisotropically magnetized such that a plurality of (e.g., four) magnetic poles are circumferentially aligned and the magnetic fluxes curve in circular-arc shape. With the polar anisotropic magnetization, a surface magnetic flux density distribution having a sinusoidal wave like pattern is obtained. Even when the brake magnet 44 is rotated, an even and high-density magnetic flux density distribution is obtained and the spool 12 is enhanced in the rotational balance.

As shown in FIG. 2, using a coil attachment member 48, the plurality of coils 46 is mounted to the reel body 1 through the circuit board 31. The both ends of the plurality of series-connected coils 46 are electrically connected to the circuit board 31. As shown in FIGS. 5 and 6, in the present preferred embodiment, four coils 46 are mounted to the circuit board 31 so as to be circumferentially aligned. Each of the coils 46 curves in a circular-arc shape, and the entirety of the coils 46 form a roughly tubular shape. A magnetic flux leakage block member 58 is disposed on the outer peripheral side of the coils 46, and is also mounted to the inner peripheral surface of the bobbin trunk 12a of the spool 12 so as to be unitarily rotatable therewith. The magnetic flux leakage block member 58 blocks the magnetic flux, which is emitted from the brake magnet 44 and acts on the coils 46, from leaking to the spool 12 side. With this configuration, the magnetic flux emitted from the brake magnet 44 efficiently concentrates on the coils 46, and the spool 12 is further enhanced in rotational balance. The coils 46 are sealed by the cover member 38 to be described.

<Circuit Board>

As shown in FIGS. 2 and 6, the circuit board 31 has a disc shape having a through hole 31c. The circuit board 31 is mounted to a surface, faced to the spool 12, of the shaft support portion 8 and is disposed on the outer peripheral side of the bearing accommodation part 8a. The circuit board 31 is fixed to the cover portion 6 together with the shaft support portion 8, the cover member 38 and the first shield member 40 by the bolt members 24. A controller for electrically controlling the brake portion 30 and a plurality of detectors for detecting the regulation positions of the first and second regulators 32 and 34 and the rotational speed of the spool 12 are mounted to the circuit board 31.

<First Regulator>

The first regulator 32 is selects any of a plurality of brake modes of the brake portion 30. In the brake modes, a brake force varies with time in different patterns. In the present preferred embodiment, variation in brake force with time can be regulated in three brake modes depending on, for instance, types of fishing line (e.g., nylon line, fluorocarbon line (polyvinylidene fluoride line), PE line (polyethylene fiber thread), etc.).

Figure 9:
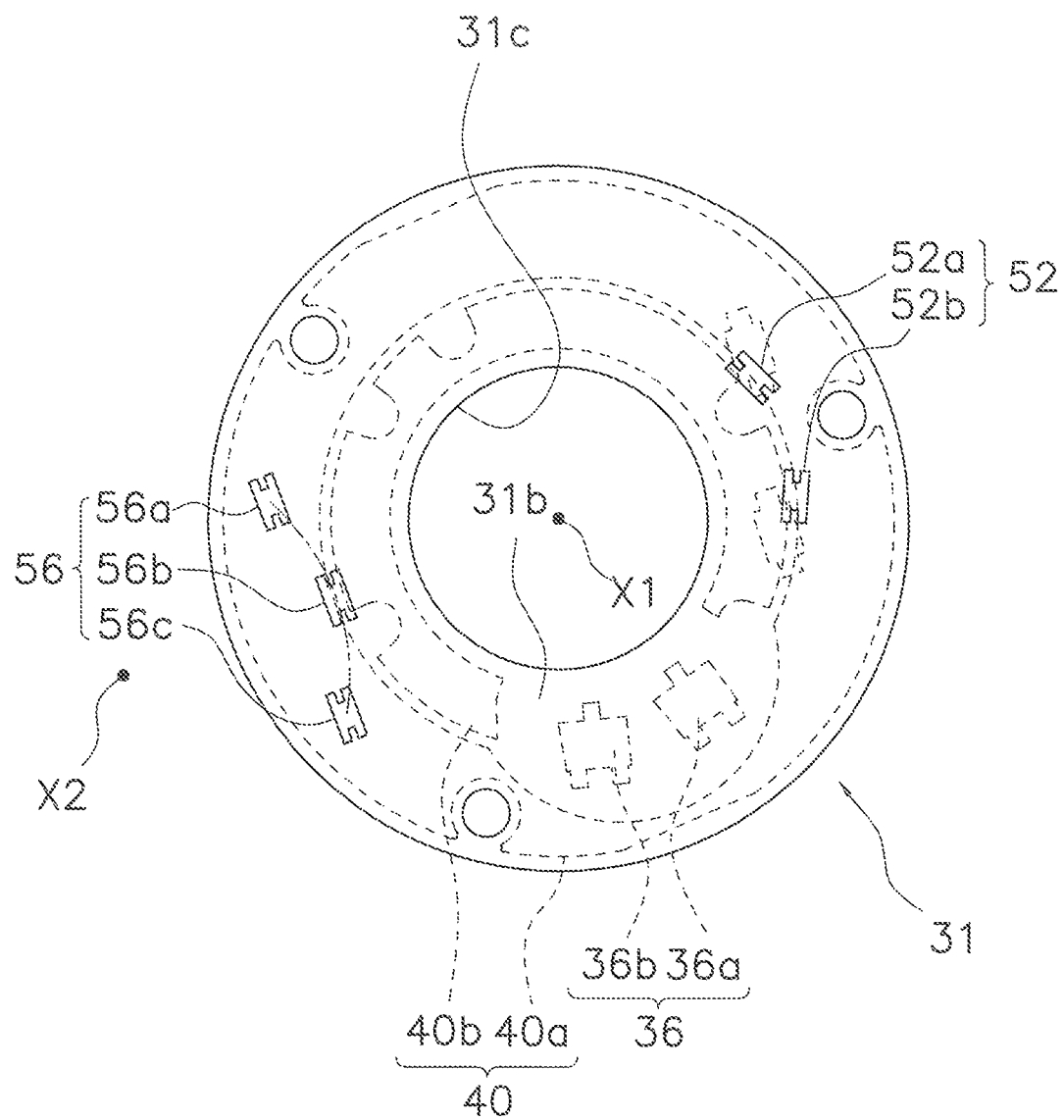
FIG. 9 is a bottom view of the circuit board seen from a second surface side.

The first regulator 32 includes the first operating portion 50 and a first detector 52 (see FIGS. 6 and 9). The first operating portion 50 includes at least one (e.g., two) first magnet 50a. The first detector 52 is faced to the two first magnets 50a and is configured to detect the regulation position of the first operating portion 50.

The first operating portion 50 is mounted to the reel body 1 so as to be movable within a first regulation range composed of a plurality of levels. In the present preferred embodiment, the first operating portion 50 is rotatably mounted to the inner surface 6b of the cover body 6a so as to be able to be positioned to, for instance, any of three levels composing the first regulation range. The first operating portion 50 has a lever member 50b to which the (e.g., two) first magnets 50a are mounted. The lever member 50b has a first exposed part 50c on the tip end thereof. The first exposed part 50c curves in a circular-arc shape and has a plurality of convex parts 50d. The convex parts 50d are formed on the surface of the first exposed part 50c so as to be circumferentially aligned at intervals. The lever member 50b is attached to the outer peripheral surface of the first mount boss 6d so as to be rotatable about the first axis X1 within the first regulation range. The first regulation range is an angular range of, for instance, 30 degrees or less. In the present preferred embodiment, the first mount boss 6d is disposed concentrically relative to the spool shaft 16. Thus, the first operating portion 50 is rotated about the spool shaft 16. Where the first operating portion 50 is mounted to the cover portion 6, the first exposed part 50c thereof protrudes from and is exposed through the first opening 6h bored in the first circumferential part 6f. However, where the cover portion 6 is mounted to the first side plate 5a, that is, where the brake unit 20 is mounted to the reel body 1, the first circumferential part 6f is covered with the thumb rest 9 and thus the first exposed part 50c of the first operating portion 50 hides in the reel body 1. With this configuration, unintentional changing the regulated condition can be avoided.

As shown in FIGS. 6 and 9, the first detector 52 is disposed in an outer peripheral side position on a second surface 31b of the circuit board 31 so as to be away from the brake magnet 44. The first detector 52 includes two hall elements 52a and 52b. The hall elements 52a and 52b are disposed on the second surface 31b so as to be able to be faced to the two first magnets 50a. The two hall elements 52a and 52b are disposed about the first axis X1 at a predetermined interval.

<Second Regulator>

First, as shown in FIGS. 2 and 6, the second regulator 34 is provided for selecting any of a plurality of brake forces of the brake portion 30. The brake forces herein have different magnitudes. In the present preferred embodiment, the magnitudes of brake force can be regulated in, for instance, eight levels. The second regulator 34 includes the second operating portion 54 and a second detector 56. The second operating portion 54 includes at least one (e.g., three) second magnet 54a. The second detector 56 is faced to the three second magnets 54a and is configured to detect the regulation position of the second operating portion 54.

The second operating portion 54 is mounted to the reel body 1 so as to be movable within a second regulation range composed of a plurality of levels. In the present preferred embodiment, the second operating portion 54 is rotatably mounted to the inner surface 6b of the cover body 6a so as to be able to be positioned to, for instance, any of eight levels composing the second regulation range. The second regulation range is an angular range of, for instance, 120 degrees or less. The second operating portion 54 includes an operating portion body 54b and a second exposed part 54c. The operating portion body 54b is a member to which the (e.g., three) second magnets 54a are mounted. The second exposed part 54c is fixed to the operating portion body 54b by, for instance, elastic coupling. The operating portion body 54b is attached to the inner surface 6b of the cover body 6a by a screw member 55 to be screwed into the second mount boss 6e so as to be rotatable about the second axis X2. Where the cover portion 6 is mounted to the reel body 1, the second exposed part 54c is exposed through the second opening 6i bored in the second circumferential part 6g. With this configuration, the position of the second operating portion 54 can be regulated with the tip of the user's finger holding the dual-bearing reel 100 on the palm when fishing.

As shown in FIGS. 6 and 9, the second detector 56 is disposed in an outer peripheral side position on the second surface 31b of the circuit board 31 so as to be away from the brake magnet 44. The second detector 56 is disposed on the second surface 31b of the circuit board 31 so as to be away from the first detector 52 substantially at an angular interval of 180 degrees. The second detector 56 includes three hall elements 56a, 56b and 56c. The three hall elements 56a, 56b and 56c are disposed on the second surface 31b of the circuit board 31 so as to be able to be faced to the three second magnets 54a. The three hall elements 56a, 56b and 56c are disposed about the second axis X2 at intervals.

<Rotation Detector>

Figure 7:
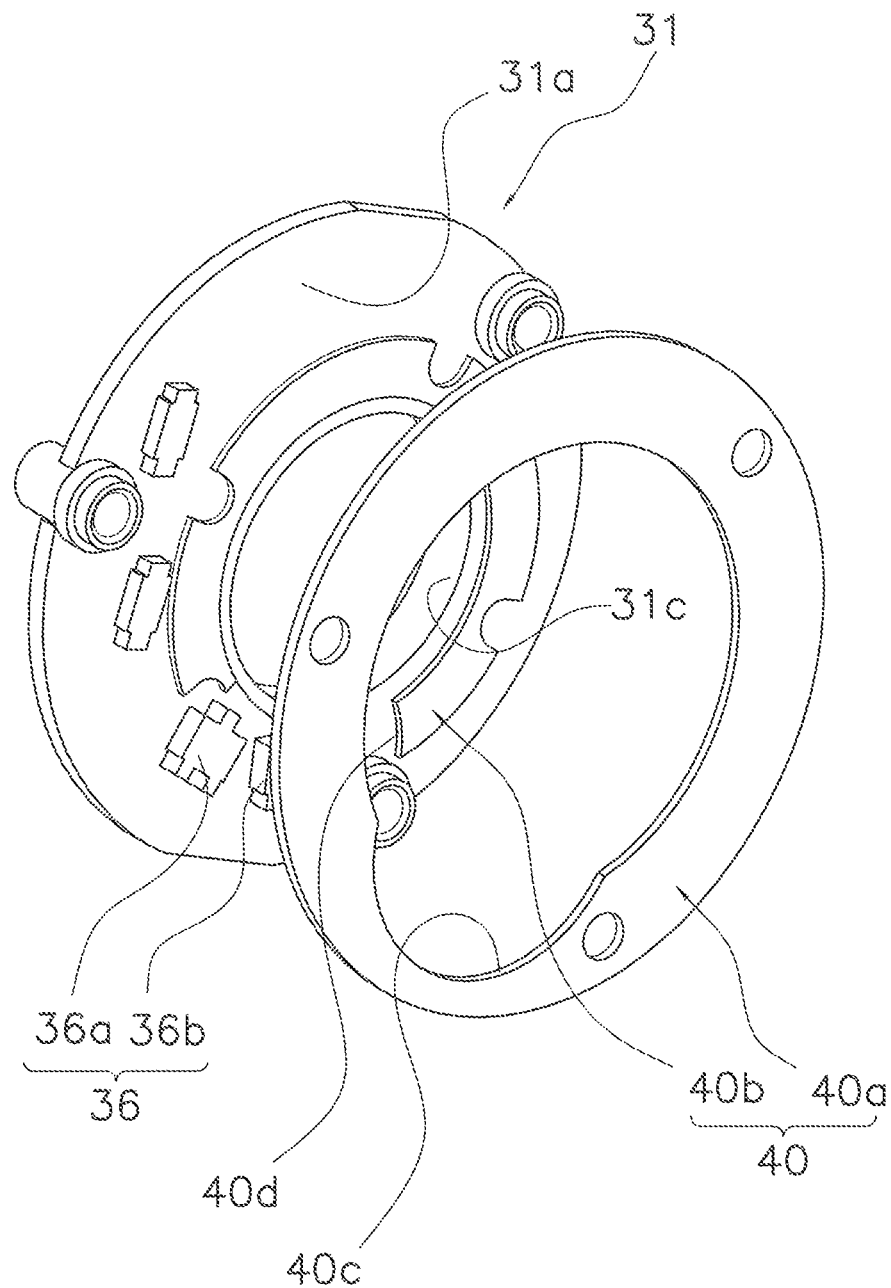
FIG. 7 is an exploded perspective view of a circuit board and a first shield member.
Figure 8:
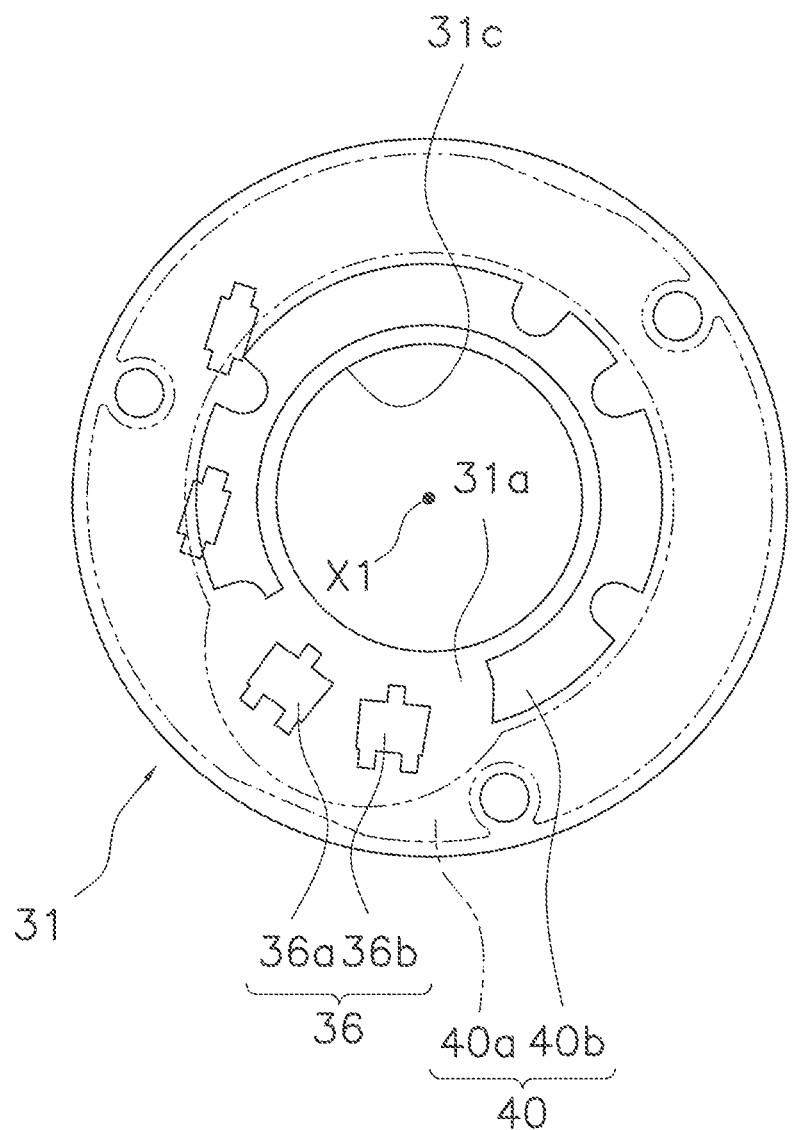
FIG. 8 is a plan view of the circuit board seen from a first surface side.

As shown in FIGS. 7 and 8, the rotation detector 36 is provided for detecting the rotational speed of the spool 12 and the rotational direction of the spool 12 on the basis of variation in magnetic flux of the brake magnet 44. Furthermore, tension acting on the fishing line can be also detectable on the basis of variation in rotational speed of the spool 12 with time. The rotation detector 36 includes two hall elements 36a and 36b. The hall elements 36a and 36b are disposed in inner peripheral side positions on a first surface 31a of the circuit board 31 so as to be aligned about the first axis X1 at an interval.

<Cover Member>

As shown in FIG. 2, the cover member 38 is a stepped tubular member made of synthetic resin and insulates the circuit board 31, the coils 46 and electric components mounted to the circuit board 31. The cover member 38 includes a first cover part 38a and a second cover part 38b. The first cover part 38a covers the tip ends, the inner peripheral parts and the outer peripheral parts of the plurality of coils 46. The second cover part 38b is integrated with the first cover part 38a, and covers the outer peripheral part, the inner peripheral part, the first surface 31a and the second surface 31b of the circuit board 31. The first cover part 38a is disposed on the outer peripheral side of the brake magnet 44. That is, the cover member 38 seals the circuit board 31 by covering the entire surface of the circuit board 31 to which the coils 46 and the electric components including the detectors are mounted. The second cover part 38b has a stepped surface 38c. The stepped surface 38c is a step between the first cover part 38a and the second cover part 38b and is located on a side faced to the spool 12. It should be noted that the cover member 38 is not illustrated in FIG. 6.

<First Shield Member>

As shown in FIGS. 7 to 9, the first shield member 40 is a member made of, for instance, an iron plate. At least a part of the first shield member 40 is mounted to the first surface 31a of the circuit board 31. The first shield member 40 shields the magnetic flux of the brake magnet 44 that is directed toward the first detector 52 and the second detector 56. With the mounting of the first shield member 40, the first detector 52 and the second detector 56 can accurately detect the first magnets 50a and the second magnets 54a without being affected by the magnetic flux of the brake magnet 44. The first shield member 40 is disposed between the first detector 52 and the brake magnet 44. Furthermore, the first shield member 40 is also disposed between the second detector 56 and the brake magnet 44. The first shield member 40 has a first shield portion 40a having a ring shape and a second shield portion 40b. The first shield portion 40a is fixed to the stepped surface 38c of the second cover part 38b that is faced to the spool 12. The second shield portion 40b is fixed to the first surface 31a of the circuit board 31 by an arbitrary fixation method such as bonding, and shields a region located on the inner peripheral side of the first shield portion 40a. The first shield portion 40a has a cutout 40c for magnetic flux penetration in the inner peripheral part thereof. The cutout 40c is formed for enabling efficient transmission of the magnetic flux of the brake magnet 44 to the rotation detector 36. When the first shield portion 40a is fixed to the cover member 38, the cutout 40c is configured to be disposed in a position faced to the rotation detector 36. The first shield portion 40a is fixed to the cover portion 6 by the bolt members 24 together with the shaft support portion 8 and the circuit board 31 sealed by the cover member 38. The second shield portion 40b is a C-shaped member disposed on the inner peripheral side of the first shield portion 40a. The second shield portion 40b is fixed to a part of the circuit board 31, i.e., a part enclosing the through hole 31c by an arbitrary fixation method such as bonding. The second shield portion 40b has a part 40d as an opening of the C-shaped contour. The part 40d is disposed in a position faced to the cutout 40c. This configuration enables more efficient transmission of the magnetic flux of the brake magnet 44.

In the brake unit 20 constructed as described above, the first shield member 40 is disposed both between the brake magnet 44 and the first detector 52 and between the brake magnet 44 and the second detector 56. With this configuration, the magnetic flux of the brake magnet 44 is shielded by the first shield member 40. Accordingly, the magnetic flux of the brake magnet 44 is unlikely to reach the first detector 52 and the second detector 56. That is, the first detector 52 and the second detector 56 are unlikely to be affected by the magnetic flux of the brake magnet 44. As a result, when the first operating portion 50 (or the second operating portion 54) is operated and the magnetic fluxes of the first magnets 50a (or the second magnets 54a) vary, the first detector 52 (or the second detector 56) can accurately detect the regulation position of the first operating portion 50 (or the second operating portion 54). Consequently, restrictions on positional arrangement of the first operating portion 50 (or the second operating portion 54) can be eased, and the regulation position of the first operating portion 50 (or the second operating portion 54) can be detected with a simple and non-contact construction.

Second Preferred Embodiment

In the first preferred embodiment, the first shield member 40 is designed to be mounted between the brake magnet 44 and both of the first detector 52 and the second detector 56. In the present invention, however, the positional arrangement of the first shield member 40 is not limited to the above.

Figure 10:
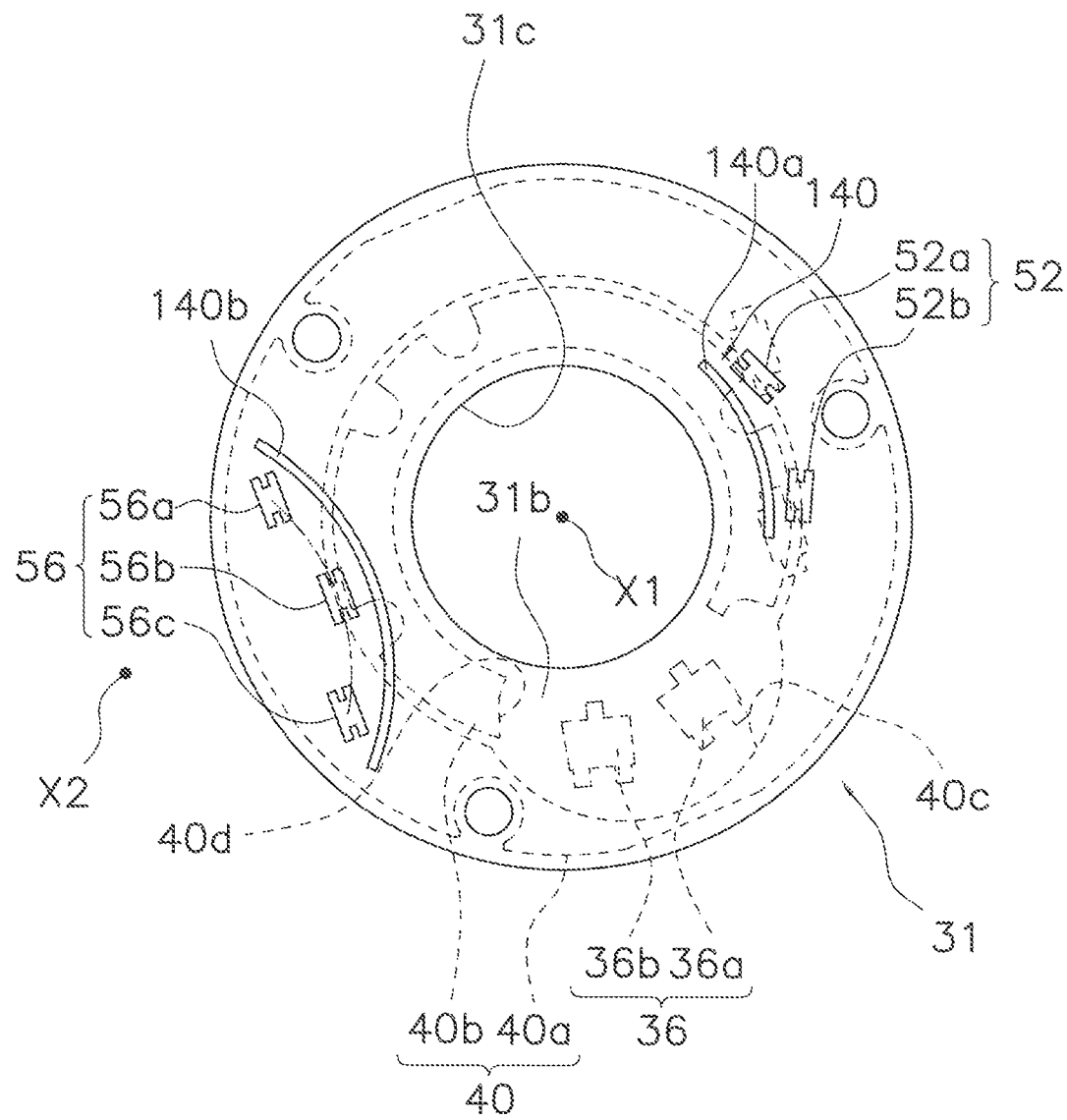
FIG. 10 is a diagram of a circuit board according to a second preferred embodiment and corresponds to FIG. 9.

In a second preferred embodiment shown in FIG. 10, a second shield member 140 is disposed on the second surface 31b of the circuit board 31 so as to be disposed both between the first detector 52 and the second magnets 54a and between the second detector 56 and the first magnets 50a. The second shield member 140 is formed by, for instance, curving an iron plate having a predetermined width (of e.g., roughly 5 mm). The second shield member 140 has a third shield portion 140a and a fourth shield portion 140b. The third shield portion 140a shields transmission of the magnetic fluxes of the second magnets 54a to the first detector 52. The fourth shield portion 140b shields transmission of the magnetic fluxes of the first magnets 50a to the second detector 56. In FIG. 10, the third shield portion 140a has a circular-arc shape about the first axis X1, whereas the fourth shield portion 140b has a circular-arc shape about the second axis X2. It should be noted that the shapes of the third and fourth shield portions 140a and 140b are not limited to the circular-arc shapes. The third and fourth shield portions 140a and 140b may have arbitrary shapes and may be disposed in arbitrary positions as long as the third shield portion 140a can shield transmission of the magnetic fluxes of the second magnets 54a to the first detector 52 whereas the fourth shield portion 140b can shield transmission of the magnetic fluxes of the first magnets 50a to the second detector 56.

Third Preferred Embodiment

Figure 11:
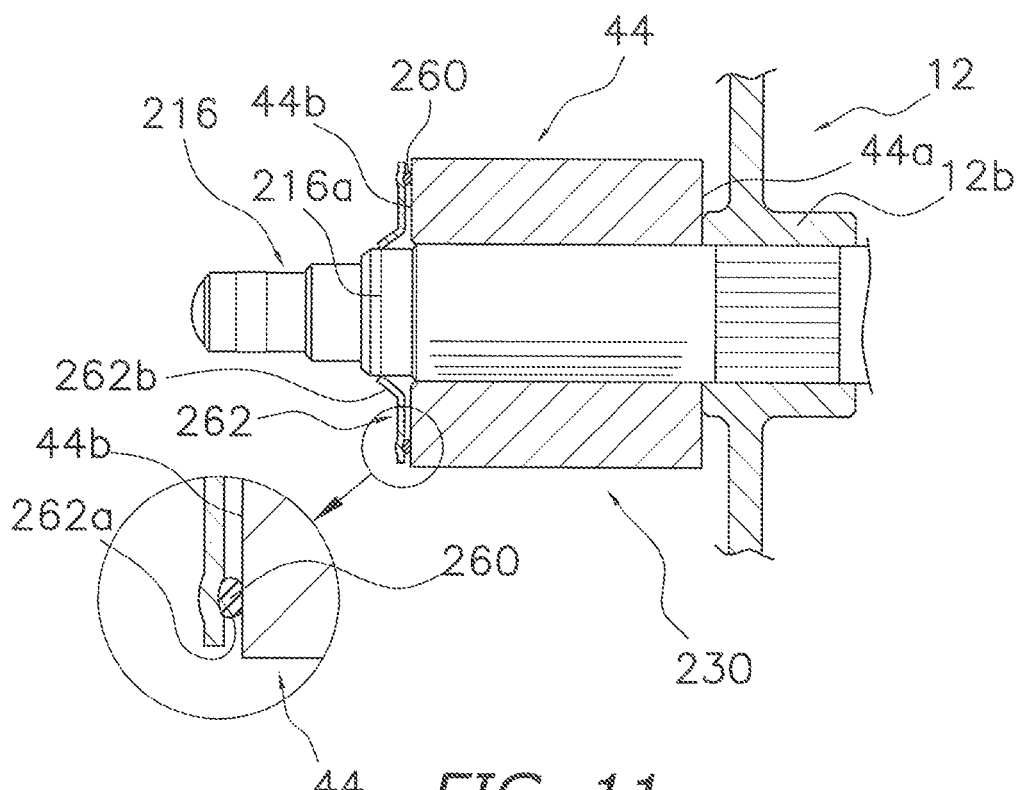
FIG. 11 is a diagram of a magnet according to a third preferred embodiment and corresponds to FIG. 5.

In a third preferred embodiment of the present invention shown in FIG. 11, a brake portion 230 further includes an O-ring 260 and a compression member 262. The O-ring 260 is contactable to the second end surface 44b. The compression member 262 is fixed to a spool shaft 216, and can compress the O-ring 260 while the O-ring 260 is interposed and held between itself and the second end surface 44b. The O-ring 260 is an exemplary elastic ring. The compression member 262 is an annular member, and has an annular recess 262a on its outer peripheral part in order to attach the O-ring 260. Furthermore, the compression member 262 has a tapered part 262b in its inner peripheral part. The tapered part 262b functions as a disc spring. The inner diameter of the tapered part 262b is slightly smaller than the outer diameter of a part of the spool shaft 216 to which the compression member 262 is mounted. The spool shaft 216 has an annular groove 216a on its part to which the tapered part 262b of the compression member 262 is mounted. The annular groove 216a has a slight width (of e.g., roughly 1 mm) and a slight depth (of e.g., roughly 1 mm). The annular groove 216a is formed for positioning and retaining the compression member 262 in the spool shaft direction.

In attaching the brake magnet 44 to the spool shaft 216, the brake magnet 44 is disposed on the outer peripheral surface of the spool shaft 216. Next, the O-ring 260 is attached to the annular recess 262a of the compression member 262, and the compression member 262 to which the O-ring 260 is mounted is attached to the spool shaft 216. Then, the compression member 262 is pressed by an arbitrary tool until the inner peripheral part of the tapered part 262b is fitted to the annular groove 216a. After the fitting of the compression member 262 to the annular groove 216a, the O-ring 260 is compressed and urges the second end surface 44b of the brake magnet 44 toward the end surface of the tubular part 12b.

Thus, in the third preferred embodiment, the brake magnet 44 is urged toward the tubular part 12b by the O-ring 260. Hence, without applying an excessive stress to the brake magnet 44, the brake magnet 44 can be mounted to the spool shaft 216 so as to be unitarily rotatable therewith. The brake magnet 44 may be herein bonded to the spool shaft 216. Alternatively, without being bonded to the spool shaft 216, the brake magnet 44 may be mounted to the spool shaft 216 so as to be unitarily rotatable therewith by a friction force to be generated by the urging force.

Fourth Preferred Embodiment

Figure 12:
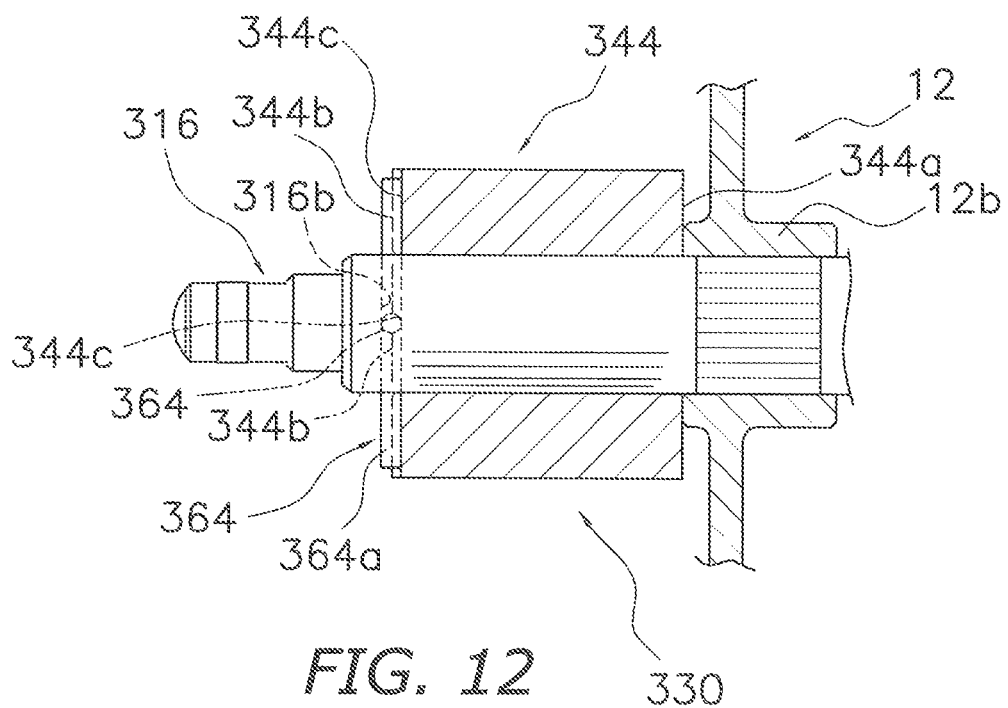
FIG. 12 is a diagram of a magnet according to a fourth preferred embodiment and corresponds to FIG. 5.

In a fourth preferred embodiment shown in FIG. 12, a brake magnet 344 has a recess 344c on a second end surface 344b located on the opposite side of a first end surface 344a. The recess 344c is recessed on the second end surface 344b along the radial direction of the second end surface 344b. In the fourth preferred embodiment, as depicted with a dashed two-dotted line in FIG. 12, the recess 344c is recessed on the second end surface 344b in a circular-arc shape. FIG. 12 shows the plan-view shapes of the recess 344c and a pin member 364a (to be described) with the dashed two-dotted line. It should be noted that the recessed shape of the recess 344c is not limited to the circular-arc shape and may be an arbitrary shape such as a circular shape or a rectangular shape.

A brake portion 330 further includes a protrusion 364. The protrusion 364 is fixed to a spool shaft 316 and is engaged with the recess 344c. The protrusion 364 has the pin member 364a. The pin member 364a is fixed to the spool shaft 316 so as to radially penetrate therethrough. The pin member 364a is press-fitted to a through hole 316b bored in the spool shaft 316 along the radial direction, and is thus fixed to the spool shaft 316 so as to be unitarily rotatable therewith.

In the fourth preferred embodiment, with the engagement of the protrusion 364 with the recess 344c, the relatively fragile brake magnet 344 can be retained without applying a stress thereto, and simultaneously, can be mounted to the spool shaft 316 so as to be unitarily rotatable therewith. Furthermore, when bonding is additionally used, wobbling of the brake magnet 344 in the rotational direction can be also reduced.

Other Preferred Embodiments

Some preferred embodiments of the present invention have been described above. However, the present invention is not limited to the aforementioned preferred embodiments, and a variety of changes can be herein made without departing from the scope of the present invention. Especially, a plurality of preferred embodiments and modifications described in the present specification can be arbitrarily combined on an as-needed basis.

(a) In the aforementioned preferred embodiments, the cover portion 6 is detachably mounted to the reel body 1. In the present invention, however, the construction of the cover portion 6 is not limited to the above. For example, the cover portion may be pivotably coupled to the reel body in an openable/closable state.

(b) In the aforementioned preferred embodiments, the plurality of first magnets 50a and the plurality of second magnets 54a enhance detection accuracy. However, only at least one first magnet 50a and at least one second magnet 54a are required. Likewise, only at least one hall element for each detector is required. Furthermore, the number of magnets and that of hall elements may be different from each other.

(c) In the aforementioned preferred embodiments, the hall elements are used for each of the first detector 52, the second detector 56 and the rotation detector 36. In the present invention, however, the constructions of the detectors are not limited to the above. Any type of magnetic sensors may be used as the detectors as long as they can detect variation in magnetic flux.

(d) In the aforementioned preferred embodiments, the first shield member 40 is divided and the divided portions are disposed on the cover member 38 and the circuit board 31. However, the shield member may be disposed only on the circuit board 31.

(e) In the aforementioned preferred embodiments, the cylindrical magnet is used as the brake magnet. In the present invention, however, the construction of the brake magnet is not limited to the above. For example, a magnet assembly, formed by circumferentially disposing a plurality of magnets, may be polar-anisotropically magnetized.

Features

The aforementioned preferred embodiments can be expressed as follows.

(A) The dual-bearing reel 100 includes the reel body 1, the spool 12, the spool shaft 16 and the brake unit 20. The reel body 1 has a pair of the first and second side plates 5a and 5b faced to each other. The spool 12 is rotatably held between the first side plate 5a and the second side plate 5b. The spool shaft 16 is a member to which the spool 12 is coupled so as to be unitarily rotatable therewith. The brake unit 20 is mounted to the reel body 1 and is configured to brake rotation of the spool 12. The brake unit 20 includes the first circumferential part 6f, the second circumferential part 6g that is different from the first circumferential part 6f, the first regulator 32 and the second regulator 34. The first regulator 32 has the first exposed part 50c that is at least partially exposed from the first circumferential part 6f, and is configured to regulate a brake force within the first regulation range. The second regulator 34 has the second exposed part 54c that is at least partially exposed from the second circumferential part 6g, and is configured to regulate the brake force within the second regulation range that is different from the first regulation range. The reel body 1 has the first bulge part 9a (an exemplary restriction part) that covers at least either of the first exposed part 50c and the second exposed part 54c.

In the present dual-bearing reel 100, the first regulator 32 is at least partially exposed from the first circumferential part 6f of the brake unit 20, whereas the second regulator 34 is at least partially exposed from the second circumferential part 6g of the brake unit 20. At least either of the first regulator 32 and the second regulator 34 is configured to be covered with the first bulge part 9a when the brake unit 20 is mounted to the reel body 1. The first regulator 32 is herein configured to be exposed from the first circumferential part 6f, whereas the second regulator 34 is configured to be exposed from the second circumferential part 6g. Thus, each of the first and second regulators 32 and 34 can be reduced in dimension in the direction of the spool shaft 16 of the spool 12. Furthermore, when the brake unit 20 is mounted to the reel body 1, at least either of the exposed first and second regulators 32 and 34 is covered with the first bulge part 9a. Thus, the dual-bearing reel 100, in which at least either of the first and second regulators 32 and 34 is covered, can be reduced in dimension in the direction of the rotary shaft of the spool 12.

(B) The brake unit 20 may include the cover portion 6. The cover portion 6 is attachable to the reel body 1 and has the first opening 6h and the second opening 6i. The first opening 6h is bored in the first circumferential part 6f so as to expose the first exposed part 50c therethrough. The second opening 6i is bored in the second circumferential part 6g so as to expose the second exposed part 54c therethrough. In the construction, when the cover portion 6 is detached from the reel body 1, the first exposed part 50c of the first regulator 32 is exposed through the first opening 6h, and this enables operation of the first regulator 32.

(C) The brake unit 20 may be capable of electrically braking the spool 12. In the construction, the spool 12 can be electrically braked, and thus, variation in brake force with time can be flexibly set without being restricted by the rotational speed of the spool 12.

(D) The first regulator 32 may include the first operating portion 50 and the first detector 52. The first operating portion 50 has at least one first magnet 50a and is at least partially exposed from the first circumferential part 6f. The first detector 52 is faced to the first magnets 50a, and is configured to detect the regulation position of the first operating portion 50. In the construction, the regulation position of the first operating portion 50 can be detected by detecting the magnetic fluxes of the first magnets 50a. Thus, restrictions on the positional arrangement of the first detector 52 can be eased.

(E) The second regulator 34 may include the second operating portion 54 and the second detector 56. The second operating portion 54 has at least one second magnet 54a and is at least partially exposed from the second circumferential part 6g. The second detector 56 is faced to the second magnets 54a, and is configured to detect the regulation position of the second operating portion 54. In the construction, the regulation position of the second operating portion 54 can be detected by detecting the magnetic fluxes of the second magnets 54a. Thus, restrictions on the positional arrangement of the second detector 56 can be eased.

(F) The brake unit 20 may further include the brake portion 30 and the first shield member 40. The brake portion 30 has the coils 46 and the brake magnet 44. The coils 46, serving as conductors, are mounted to one of the reel body 1 and the spool 12. The brake magnet 44 is mounted to the other of the reel body 1 and the spool 12 so as to be at least partially faced to the coils 46 through a predetermined gap. The first shield member 40 is disposed between the first detector 52 and the brake magnet 44.

In the brake unit 20, the regulation position of the first operating portion 50 is detected when the first detector 52 of the first regulator 32 detects the first magnets 50a included in the first operating portion 50. The first shield member 40 is disposed between the first detector 52 and the brake magnet 44 in order to shield the magnetic flux of the brake magnet 44. With the construction, the first detector 52 is unlikely to be affected by the brake magnet 44 even when the regulation position of the first operating portion 50 is detected on the basis of the detection of the first magnets 50a. Thus, the position of the first operating portion 50 can be accurately detected. Additionally, the reel body 1 is not required to have a structure (e.g., a hole) for detecting the first operating portion 50. Moreover, the first operating portion 50 can be disposed in an arbitrary position as long as the first magnets 50a can be detected by the first detector 52 that is shielded from the magnetic flux of the brake magnet 44 by the first shield member 40. Therefore, restrictions on the positional arrangement of the first operating portion 50 can be eased, and the regulation position of the first operating portion 50 can be detected with a non-contact and simple construction.

(G) The brake unit 20 may further include the circuit board 31. The circuit board 31 is mounted to the reel body 1 and has the first surface 31a faced to the spool 12. The brake magnet 44 may be a cylindrical magnet mounted to the spool 12. The conductors may be formed by the plurality of coils 46. The coils 46 are mounted to the first surface 31a of the circuit board 31 so as to be disposed on the outer peripheral side of the cylindrical brake magnet 44 at predetermined intervals. In this configuration, the brake unit 20 capable of electrically braking the spool 12 can be produced. Furthermore, restrictions on the positional arrangement of the first operating portion 50 can be eased, and the regulation position of the first operating portion 50 can be detected with a non-contact and simple construction.

(H) The first shield member 40 may be mounted to at least a part of the first surface 31a of the circuit board 31. In this configuration, the magnetic flux directed toward the first detector 52 can be efficiently shielded by disposing the first detector 52 on the second surface 31b located on the opposite side of the first surface 31a of the circuit board 31.

(I) The brake unit 20 may further include the rotation detector 36 for detecting the rotation of the spool 12 by variation in magnetic flux of the brake magnet 44. In this configuration, the rotation of the spool 12 can be detected with the brake magnet 44. Thus, the spool 12 is not required to have a component for rotation detection, and can be simply constructed.

(J) The first shield member 40 may have the cutout 40c formed so as to enclose the rotation detector 36. In this configuration, the magnetic flux of the brake magnet 44 reaches the rotation detector 36 through the cutout 40c without being shielded. Thus, the rotational speed of the spool 12 and so forth can be accurately detected.

(K) The first shield member 40 may be additionally disposed between the second detector 56 and the brake magnet 44. In this configuration, the second detector 56 is unlikely to be affected by the magnetic flux of the brake magnet 44.

(L) The brake unit 20 may further include the stepped tubular cover member 38 made of synthetic resin. The cover member 38 has the first cover part 38a and the second cover part 38b. The first cover part 38a covers the plurality of coils 46. The second cover part 38b covers at least the first surface 31a of the circuit board 31 and is integrally formed with the first cover part 38a. In this configuration, the circuit board 31 and electric components mounted thereto such as the first detector 52, the second detector 56 and the rotation detector 36 can be protected by the cover member 38.

(M) The first shield member 40 may include the first shield portion 40a and the second shield portion 40b. The first shield portion 40a is disposed on the stepped surface 38c, faced to the spool 12, of the second cover part 38b. The second shield portion 40b is disposed on the first surface 31a of the circuit board 31 so as to shield a region located on the inner peripheral side of the first shield portion 40a. In this configuration, the first shield member 40 can be divided and disposed on the cover member 38 and the circuit board 31. Thus, the magnetic flux of the brake magnet 44 can be efficiently shielded by the first shield member 40.

(N) The brake unit 20 may further include the second shield member 140. The second shield member 140 is mounted to at least a part of the second surface 31b, located on the opposite side of the first surface 31a, of the circuit board 31 so as to be disposed at least either between the first magnets 50a and the second detector 56 or between the second magnets 54a and the first detector 52. In this configuration, at least either of the first and second detectors 52 and 56 is unlikely to be affected by the magnets 50a, 54a for positional detection. Thus, at least either of the first and second detectors 52 and 56 can be further enhanced in accuracy of detection.

(O) The brake magnet 44 may be polar-anisotropically magnetized. In this configuration, the brake magnet 44 is not radial-anisotropically magnetized such that N-poles and S-poles are radially aligned, but is polar-anisotropically magnetized such that N-poles and S-poles are circumferentially aligned. Thus, a surface magnetic flux density distribution having a sinusoidal wave like pattern is obtained and magnetic flux density less varies. Accordingly, the spool 12 can have an enhanced rotational balance.

(P) The brake magnet 44 may be mounted to the spool shaft 16 by bonding so as to be unitarily rotatable therewith. In this configuration, a strong force does not act on the brake magnet 44. Thus, the relatively fragile brake magnet 44 can be easily mounted to the spool shaft 16 without being damaged or broken.

(Q) The brake portion 30 may further include the O-ring 260 and the compression member 262. The O-ring 260 is contactable to the second end surface 44b, located on the opposite side of the first end surface 44a, of the brake magnet 44. The compression member 262 is fixed to the spool shaft 216 and is capable of compressing the O-ring 260 together with the second end surface 44b by interposing and holding the O-ring 260 therebetween. In this configuration, the brake magnet 44 is urged toward the tubular part 12b by the O-ring 260. Hence, the brake magnet 44 can be mounted to the spool shaft 216 so as to be unitarily rotatable therewith without applying an excessive stress to the brake magnet 44. The brake magnet 44 may be herein bonded to the spool shaft 216. Alternatively, without being bonded to the spool shaft 216, the brake magnet 44 may be mounted to the spool shaft 216 so as to be unitarily rotatable therewith by a friction force to be generated by the urging force.

(R) The brake magnet 344 may have the recess 344c on the second end surface 344b. The brake portion 330 may further include the protrusion 364 that is fixed to the spool shaft 316 and is engaged with the recess 344c. In this configuration, the protrusion 364 is engaged with the recess 344c, and thus, the brake magnet 344 can be retained without applying stress to the brake magnet 344, and simultaneously, the brake magnet 344 can be mounted to the spool shaft 316 so as to be unitarily rotatable therewith. Moreover, when bonding is additionally used, wobbling of the brake magnet 344 in the rotary direction can be also reduced.

(S) The recess 344c may be recessed on the second end surface 344b along the radial direction of the second end surface 344b. The protrusion 364 may have the pin member 364a. The pin member 364a is fixed to the spool shaft 316 so as to radially penetrate therethrough. In this configuration, the brake magnet 344 can be mounted to the spool shaft 316 so as to be unitarily rotatable therewith by simply fixing the pin member 364a with an arbitrary fixation method such as press-fitting or bonding.

What is claimed is:

1. A dual-bearing reel, comprising:
    a reel body having a pair of side plates being disposed at an interval from each other;
    a spool being rotatable supported between the side plates;
    a spool shaft coupled to the spool so as to be unitarily rotatable the spool and
    a brake unit mounted to the reel body and being configured to brake rotation of the spool,
    the brake unit including
       a first circumferential part,
       a second circumferential part different from the first circumferential part,
       a first regulator having a first exposed part and being configured to regulate a brake force within a first regulation range, the first exposed part being at least partially exposed from the first circumferential part, and
       a second regulator having a second exposed part and being configured to regulate the brake force within a second regulation range, the second exposed part being at least partially exposed from the second circumferential part, the second regulation range being different from the first regulation range, and
    the reel body further having a restriction part covering at least one of the first exposed part and the second exposed part.

2. The dual-bearing reel according to claim 1, wherein the brake unit further includes a cover portion, the cover portion being attachable to the reel body and having a first opening and a second opening, the first opening being disposed on the first circumferential part so as to expose the first exposed part therethrough, the second opening being disposed on the second circumferential part so as to expose the second exposed part therethrough.

3. The dual-bearing reel according to claim 1, wherein the brake unit is configured to electrically brake the spool.

4. The dual-bearing reel according to claim 1, wherein the first regulator includes
    a first operating portion having at least one first magnet and being at least partially exposed from the first circumferential part, and a first detector being faced to the at least one first magnet and being configured to detect a regulation position of the first operating portion.

5. The dual-bearing reel according to claim 4, wherein the second regulator includes
a second operating portion having at least one second magnet and being at least partially exposed from the second circumferential part, and
a second detector being faced to the second magnet and being configured to detect a regulation position of the second operating portion.

6. The dual-bearing reel according to claim 5, wherein the brake unit includes
a brake portion having a conductor and a brake magnet, the conductor being mounted to one of the reel body and the spool, the brake magnet being mounted to the other of the reel body and the spool so as to be at least partially faced to the conductor through a predetermined gap, and
a first shield member being disposed between the first detector and the brake magnet and shielding a magnetic flux of the brake magnet.

7. The dual-bearing reel according to claim 6, wherein the brake unit includes a circuit board, the circuit board being mounted to the reel body and having a first surface faced to the spool,
the brake magnet is a cylindrical magnet mounted to the spool, and
the conductor is formed by a plurality of coils, the coils being mounted to the first surface of the circuit board so as to be disposed on an outer peripheral side of the cylindrical magnet at predetermined intervals.

8. The dual-bearing reel according to claim 7, wherein the first shield member is mounted to at least a part of the first surface of the circuit board.

9. The dual-bearing reel according to claim 7, wherein the brake unit includes a stepped tubular cover member formed of synthetic resin, the stepped tubular cover member having a first cover part and a second cover part, the first cover part covering the plurality of coils, and the second cover part covering at least the first surface of the circuit board and being integrally formed with the first cover part.

10. The dual-bearing reel according to claim 9, wherein the first shield member includes
a first shield portion disposed on a stepped surface of the second cover part, the stepped surface being faced to the spool, and
a second shield portion disposed on the first surface of the circuit board so as to shield a region located on an inner peripheral side of the first shield portion.

11. The dual-bearing reel according to claim 7, wherein the brake unit includes a second shield member shielding a magnetic flux of the brake magnet, the second shield member being mounted to at least a part of a second surface of the circuit board, and being disposed at least one of between the first magnet and the second detector and between the second magnet and the first detector, the second surface being located on an opposite side of the first surface.

12. The dual-bearing reel according to claim 6, wherein the brake unit includes a rotation detector configured to detect rotation of the spool by variation in magnetic flux of the brake magnet.

13. The dual-bearing reel according to claim 12, wherein the first shield member has a cutout formed so as to surround the rotation detector.

14. The dual-bearing reel according to claim 6, wherein the first shield member is disposed between the second detector and the brake magnet.

15. The dual-bearing reel according to claim 6, wherein the brake magnet is a polar-anisotropic magnet.

16. The dual-bearing reel according to claim 15, wherein the brake magnet is mounted to the spool shaft by bonding so as to be unitarily rotatable with the spool shaft.

17. The dual-bearing reel according to claim 15, wherein the brake portion further includes
an elastic ring being contactable to an end surface of the brake magnet, and
a compression member fixed to the spool shaft and compressing the elastic ring together with the end surface of the brake magnet.

18. The dual-bearing reel according to claim 15, wherein the brake magnet has a recess on the end surface, and
the brake portion includes a protrusion, the protrusion being fixed to the spool shaft and being engaged with the recess.

19. The dual-bearing reel according to claim 18, wherein the recess is recessed on the end surface along a radial direction of the end surface, and
the protrusion has a pin member, the pin member being fixed to the spool shaft to radially penetrate.

* * * * *